(12) United States Patent
Luzzatto

(10) Patent No.: US 7,210,036 B2
(45) Date of Patent: Apr. 24, 2007

(54) METHOD AND SYSTEM FOR DELIVERING SECURE E-MAIL

(75) Inventor: Kfir Luzzatto, Omer (IL)

(73) Assignee: ELUV Holdings, Ltd, Omer (IL)

( * ) Notice: Subject to any disclaimer, the term of this patent is extended or adjusted under 35 U.S.C. 154(b) by 909 days.

(21) Appl. No.: 10/181,171

(22) PCT Filed: Jan. 15, 2001

(86) PCT No.: PCT/IL01/00039

§ 371 (c)(1),
(2), (4) Date: Sep. 30, 2002

(87) PCT Pub. No.: WO01/52485

PCT Pub. Date: Jul. 19, 2001

(65) Prior Publication Data

US 2003/0084347 A1   May 1, 2003

(30) Foreign Application Priority Data

Jan. 16, 2000 (IL) .................................... 134066

(51) Int. Cl.
*H04L 9/00* (2006.01)

(52) U.S. Cl. ...................... 713/171; 713/150
(58) Field of Classification Search ............... 713/152, 713/150, 171
See application file for complete search history.

(56) References Cited

U.S. PATENT DOCUMENTS 5,930,479 A   7/1999   Hall (Continued)

FOREIGN PATENT DOCUMENTS

WO   WO 98/17042   4/1998

(Continued)

OTHER PUBLICATIONS

XP-002133223, Katagishi, et al., "A Public Key Cryptography-Based Security Enhanced Mail Gateway with the Mailing List Function", *IEEE*, pp. 262-265 (1999).

*Primary Examiner*—Kambiz Zand
*Assistant Examiner*—Ellen C. Tran
(74) *Attorney, Agent, or Firm*—Roach Brown McCarthy & Gruber, P.C.; Kevin D. McCarthy

(57) ABSTRACT

A method for increasing the privacy of an e-mail message, comprises the steps of: a) providing a central Server (PS) which stores concordance tables between decryption key data and the different identification given to them by different users; b) at the Sender's terminal (ST), encrypting a message using an encryption key, and sending by e-mail the encrypted message to the Recipient (RIT); c) providing the RT with a Partial encryptionldecryption Key, which is the decryption key modified by a given Operator (OP); d) sending by the ST to said PS an Operator Identification (OI); belonging to ST, which identifies OP employed by ST to generate the encryption/decryption key, and which is obtained from the Operator Table stored at ST; e) at PS, obtaining OP from the Sender Operators Table stored at PS, using the OI; of ST sent to PS by ST; f) at PS, obtaining OI; of the RT, from the Recipient Operators Table stored at PS, using OP; g) sending to RT its OI, together with any additional data; b) at RT, receiving the encrypted message and the Partial Key from ST, and OI: from PS; i) extracting OP using the Operator Table stored at the RT, and generating therewith the decryption Key from the Partial Key; and j) decrypting the encrypted e-mail message.

21 Claims, 2 Drawing Sheets

U.S. PATENT DOCUMENTS

| | | | |
|---|---|---|---|
| 6,424,718 B1 * | 7/2002 | Holloway | 380/277 |
| 6,499,108 B1 * | 12/2002 | Johnson | 726/7 |
| 6,546,416 B1 * | 4/2003 | Kirsch | 709/206 |
| 6,681,017 B1 * | 1/2004 | Matias et al. | 380/277 |
| 7,016,863 B1 * | 3/2006 | Kamakura et al. | 705/26 |

FOREIGN PATENT DOCUMENTS

| | | |
|---|---|---|
| WO | WO 99/00958 | 1/1999 |

* cited by examiner

METHOD AND SYSTEM FOR DELIVERING SECURE E-MAIL

FIELD OF THE INVENTION

The present invention relates to a method and a system for improving the privacy of e-mail messages.

BACKGROUND OF THE INVENTION

E-mail messages are widely used today for the purpose of communicating between users throughout the world. While many private e-mail systems exist, most messages are exchanged over the Internet, in an environment that is neither private nor confidential. E-mail messages are transferred from one user to another via a plurality of servers, and therefore they can be intercepted and read by unauthorized persons.

Two main approaches exist nowadays to the solution of this problem. The first involves the encryption of the message and/or of its attachments, using a common program, with an encryption key agreed upon. This method has the disadvantage of requiring that both users use the same encryption software, and that the encryption/decryption key be agreed between them beforehand. Given the large number of encryption programs, different users must use more than one different encryption program, which is inconvenient and cumbersome.

The other approach is the establishment of a "secure communication channel". In this approach two users communicate freely between them through this channel, and they each can read the other's messages that are decrypted at their PC level, without the need to decide on a common decryption key for each message and to communicate the same to each other. However, this method has the disadvantage of requiring the opening of a specific communication channel between two users, and is therefore not flexible and simple to use.

The prior art methods also do not take into account the fact that most e-mail messages should enjoy some degree of privacy, but do not necessarily need to be strongly encrypted. The average user is uncomfortable about having his e-mail read by unauthorized persons, but it is not the general rule that e-mail messages contain top secret information.

The art has so far failed to provide a simple and convenient method by means of which two users can communicate between them by e-mail, while maintaining a reasonable degree of privacy of their communication, without the need for either opening a specific communication channel, or for agreeing before each message on a common encryption/decryption key.

It is therefore an object of this invention to provide such a system and method, by means of which privacy of the e-mail communication between any two users of the system can be maintained, even if they have not agreed beforehand on a common key, and even if they do not know one another.

It is another purpose of this invention is to provide such a method and system which are simple and convenient to operate.

It is yet another object of the invention to provide a system and method for maintaining the privacy of e-mail messages, which does not require complicated operations by the user.

Other purposes and advantages of this invention will appear as the description proceeds.

SUMMARY OF THE INVENTION

The invention is directed to a method for increasing the privacy of an e-mail message, comprising the steps of:
 providing a central Server which stores concordance tables between decryption key data and the different identification given to them by different users;
 at the Sender's terminal, encrypting a message using an encryption key, and sending by e-mail the encrypted message to the Recipient;
 providing the Recipient with a Partial encryption/decryption Key, which is the decryption key modified by a given Operator;
 sending by the Sender's terminal to said central Server an Operator Identification belonging to the Sender, which identifies the Operator employed by the Sender to generate the encryption/decryption key, and which is obtained from the Operator Table stored at the Sender's end;
 at the Server, obtaining the Operator from the Sender Operators Table stored at the Server, using the Operator Identification of the Sender sent to the Server by the Sender's terminal;
 at the Server, obtaining the Operator Identification of the Recipient, from the Recipient Operators Table stored at the Server, using the Operator;
 sending to the Recipient its Operator Identification, together with any additional data;
 at the Recipient, receiving the encrypted message and the Partial Key from the Sender, and the Operator Identification from the Server;
 extracting the Operator using the Operator Table stored at the Recipient's end, and generating therewith the decryption Key from the Partial Key; and
 decrypting the encrypted e-mail message.

The term "terminal", as used herein, should be understood to encompass all devices that may handle e-mail messages, including but not limited to Personal Computers, cellular phones, WAP terminals, hand-held organizers, etc.

According to a preferred embodiment of the invention the Server receives from the Sender and sends to the Recipient additional data. According to another preferred embodiment of the invention the additional data comprises one or more of the Sender's e-mail address, the Recipient's e-mail address, and an identifying code for the e-mail message.

Preferably, but non-limitatively, the Key is automatically generated by the agent installed at the Sender's end. However, the Key can also be generated by an action of the Sender.

The invention also encompasses a System for increasing the privacy of an e-mail message, comprising:
 a central Server which stores concordance tables between decryption key data and the different identification given to them by different users;
 a software agent provided at the Sender terminal, suitable to encrypt a message using an encryption key, and to cause the encrypted message to be sent to the Recipient by e-mail, together with a Partial encryption/decryption Key, which is the decryption key modified by a given Operator;
 a program at the Sender's end, for sending to said central Server an Operator Identification belonging to the Sender, which identifies the Operator employed by the Sender to generate the encryption/decryption key, and which is obtained from the Operator Table stored at the Sender's end;

means located at the Server, for receiving information from the Sender and for obtaining the Operator from the Sender Operators Table stored at the Server, using the Operator Identification of the Sender sent to the Server by the Sender's terminal;

means located at the Server for obtaining the Operator Identification of the Recipient, from the Recipient Operators Table stored at the Server, using the Operator, and for sending to the Recipient its Operator Identification, together with any additional data;

a software agent at the Recipient's end, for receiving the encrypted message and the Partial Key from the Sender, and the Operator Identification from the Server;

means provided at the recipient for extracting the Operator using the Operator Table stored at the Recipient end, and for generating therewith the decryption Key from the Partial Key; and software at the Recipient's end for decrypting the encrypted e-mail message.

All the above characteristics and advantages of the invention will be better understood through the following illustrative and non-limitative description of preferred embodiments thereof, with reference to the appended drawings.

DETAILED DESCRIPTION OF THE PREFERRED EMBODIMENT

Figure 1A:
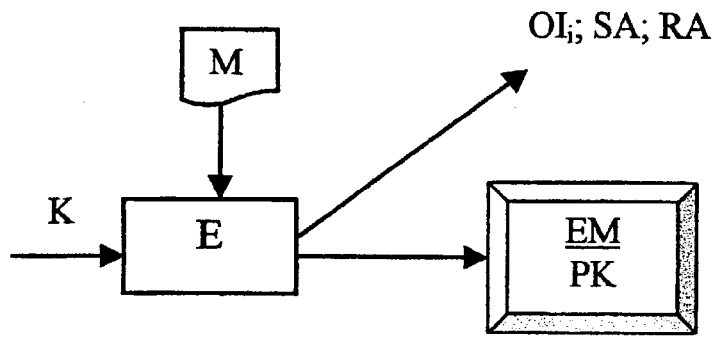
FIG. 1 schematically illustrates the operation of the system, according to one preferred embodiment of the invention.
Figure 1B:
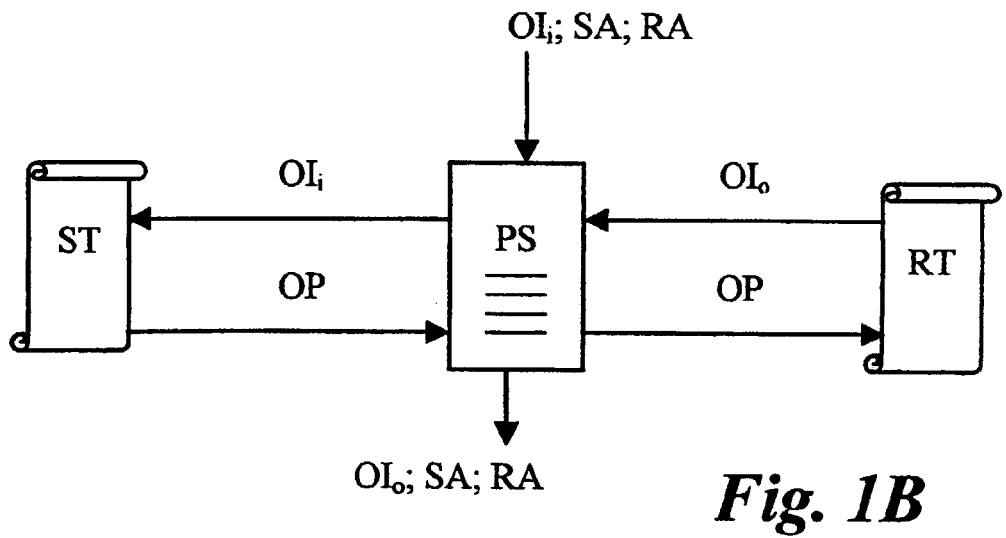
Figure 1C:
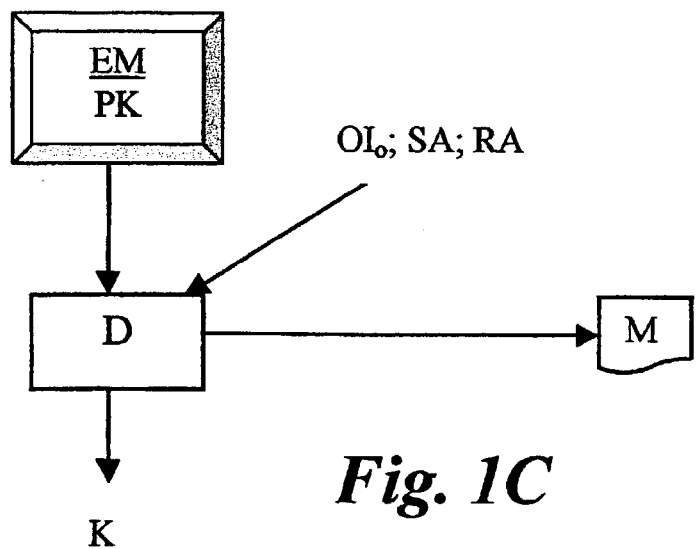

FIG. 1 schematically illustrates the operation of the system, according to one preferred embodiment of the invention. FIG. 1A is the operation at the Sender level. The message, M, to be sent, is passed through an encryption agent E, which can employ any known encryption program. An Encryption Key is provided, e.g., by a random number generator or by any other suitable program, and is used to encrypt the message, thereby to generate the encrypted message, EM. The encryption agent E also generates a partial key, PK, which is the key K that has been modified using an Operator known to the Sender. Of course, as will be appreciated by the skilled person, depending on the encryption method employed the recipient may receive the encryption key, from which he may be able to derive the decryption key, or the decryption key itself, if it cannot be derived from the knowledge of the encryption key. Therefore, the terms "decryption key" and "encryption/decryption key" are used interchangeably herein, to signify a key that enables the recipient to decrypt the message. Furthermore, the partial key PK should be understood to be any portion or transformation of the encryption and/or decryption key, as the case may be, which is not the entire key needed for decryption. Thus, PK may be obtained through a truncation of the full key, a scrambling thereof, a transformation thereof, linear or not, etc.

A simplified example is given in Table I below:

TABLE I

| Operator | Operator Identifier |
|---|---|
| ×2 | AB24JF |
| $\sqrt{K}$ | 136Y8T |
| $(K)^{1/7}$ | Zzab12J |

In this simplified table, three operators are shown: multiplication by 2, square root of the key and value of the key at the $1/7$ power. Of course, actual tables may contain hundreds of such operators, as well as many different Operator Identifiers for the same Operator. The Operator must be applied to the PK to obtain the actual Key.

The encrypted message and the PK are then sent to the Recipient. Meanwhile, the Operator Identifier $OI_f$, taken from Table I of the Sender, is sent to the Privatizing Server (PS), together with the e-mail addresses of the sender (SA) and of the recipient (RA). Additional information, such as a message-identification number can also be attached, if desired.

The PS stores the entire Operator and Operator Identifier tables of all users, i.e., tables like Table I, which it has also issued to the users. Upon receipt of the $OI_f$, SA and RA, the PS checks the value of the Operator against the table of the Sender (ST), which in our example is Table I. From the table it receives the Operator OP itself. The PS now, using the knowledge of the RA, accesses the Operator Table of the Recipient (RT), to derive therefrom an Operator Identifier ($OI_o$) for the Recipient. This is illustrated by Table II below:

TABLE II

| Operator | Operator Identifier |
|---|---|
| ×2 | Ie76FF |
| $\sqrt{K}$ | 9Ggi32 |
| $(K)^{1/7}$ | Ab34Hh |

The PS now sends the $OI_o$ to the Recipient, together with the SA and RA, and any other attached information. The agents of the Sender and Recipient can communicate with the PS by any suitable route, e.g., by e-mail or through the Internet, using a browser or other suitable program, or by telephone line.

The agent installed at the Recipient end identifies an encrypted message that has arrived. It searches for the information from the PS needed to decrypt it. Once the information is received the decrypting part of the agent determines the Operator from the $OI_o$ received from the PS, generates the decryption key K from it, and decrypts the message.

The whole process has been carried out without the intervention of the user, and using information previously provided to its agent.

EXAMPLE

Figure 2A:
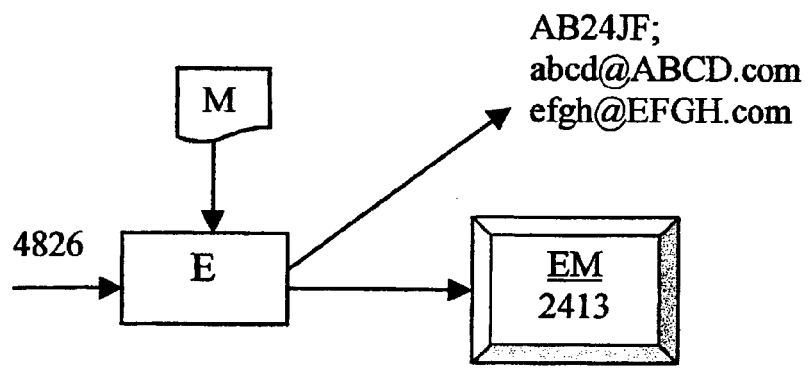
FIG. 2 is an illustrative numeric example of the preferred embodiment of FIG. 1.
Figure 2B:
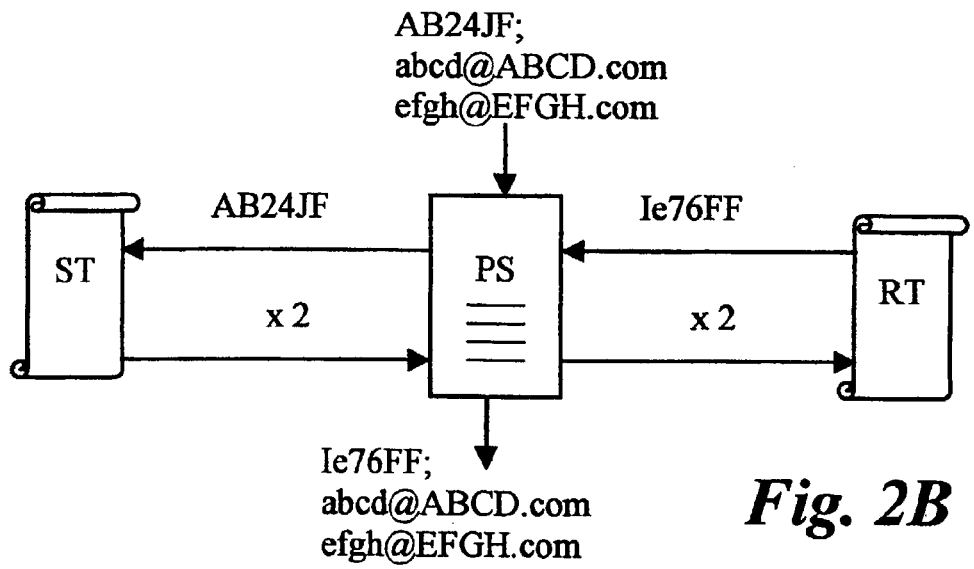
Figure 2C:
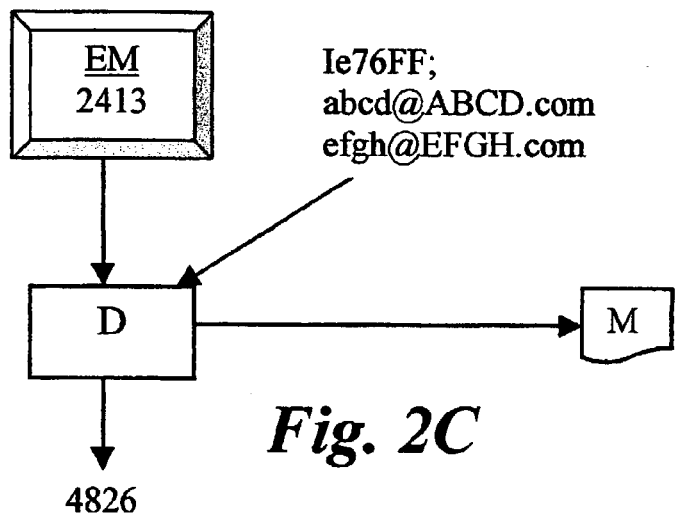

In order to further exemplify the operation according to the above-described preferred embodiment of the invention, FIG. 2 has been provided with the actual data arising from Tables I and II. The original Encryption Key has been chosen for this example to be a simple number, 4826, for the sake of simplicity. The Sender's e-mail address is symbolized by abcd@ABCD.com, and that of the Recipient by efgh@EFGH.com.

As will be appreciated by the skilled person, this process takes place even between persons who have never corresponded before, and who do not know each other. The method of the invention can be exploited in different ways to correspond by private e-mail when the Recipient is not registered with the Server, i.e., does not have a software agent installed on his terminal, and does not have his own table of Operators and Operator Identifiers. Different methods can be devised by the skilled person, such as the following two illustrative and non-limitative methods:

Method #1

This method assumes that the Recipient is willing to register as a registered user with the Server. The process then proceeds as follows:

1) The Sender sends to the Recipient the encrypted message with the partial key. The Sender's agent also attaches to the message (i.e., the encrypted message or the key) a self-activated program that generates a pop-up window on the terminal of the Recipient. Alternatively, the self-activated program can be sent by the Server to the Recipient, when the Server is unable to locate the Recipient's address in its database. The pop-up window contains information for the Recipient, indicating that a message is waiting for him (although the message is already in his terminal, but cannot be processed because no agent is installed). The Recipient is offered various options, among which there is the option to subscribe to the Server.

2) The Recipient follows instructions (which may include a link leading to the Server), and the Server generates a Table of Operators and Operator Identifiers for the new user, provides the Recipient with the software agent and the Table of Operators and Operator Identifiers, and sends the Operator Identifier that belongs to the original message to the Recipient.

3) The Recipient installs the software agent on his terminal, and is now able to receive messages from all other Senders.

Method #2

This method assumes that the Recipient is not willing to register as a registered user with the Server. The process then proceeds as follows:

1) Step no. 1 is as in Method #1.

2) The Recipient is sent by the Server a temporary agent, together with the Operator needed to obtain the full decryption key of the message.

3) Running the program (the temporary agent) decrypts the message, but no agent is permanently installed on the Recipient's terminal.

Payment from the users can be obtained directly for the service, or indirectly. For instance, the server may impose a payment for each transaction, or for providing the list of Operators, periodically or otherwise. Updated lists can also be provided by e-mail, privatized by the same method.

The invention can also be exploited to perform, manage and control certified operations, in which it is important to know with a high degree of confidence that a message has been generated by a given entity, and received by another given entity. For instance, the method of the invention can be used to draw prizes in a lottery-like scheme. The method permits to trace a given message and/or its routing history with a high degree of confidence. An example is a shop that supplies goods or services by order over the Internet. In this case, if an order is placed via e-mail, the specific e-mail message can be traced, for instance, using its PK or other added data (such as a certificate or serial number) that is transmitted together with the message. This message number or identifier can then be used to participate in a lottery in which messages are drawn and prizes allotted to their senders or recipients, according to a predetermined rule.

Another important application of the invention is the reduction or prevention of the receipt of undesirable e-mail (sometime also termed "Junk e-mail"). This is a problem that is expanding rapidly as the use of e-mail becomes more popular, and virtually every e-mail user needs to deal with mail that is forced upon him, and which he does not desire to receive. According to the invention, there are two ways to improve the privacy of the e-mail channel in this respect:

1. Distributors of undesired e-mail messages (also sometimes called e-mail spammers) often send out a large number of e-mail messages at the same time. The PS Server can be easily configured to stop mail arriving from a source that has not previously identified itself as a legitimate distributor, if the number and/or the frequency of messages it distributes exceeds a predetermined limit. Thus, users of the private e-mail channel will automatically be protected from this kind of messages.

2. A user of a private e-mail system may advise the PS Server that it does not desire to receive messages from a given Sender, for instance, by sending a junk mail message that he has received from that Sender to the Server. When this happens, the PS Server will refuse to provide an Operator Identification for messages directed to that user and originating from that Sender, thus effectively filtering out messages of undesired origin.

Of course, many different PS Servers may co-exist on the Internet, and different organizations may provide such services, in addition to those provided by dedicated, central servers. Software agents for this purpose may be configured to serve more than one PS Server.

While embodiments of the invention have been described by way of illustration, it will be understood that the invention can be carried out by persons skilled in the art with many modifications, variations and adaptations, without departing from its spirit or exceeding the scope of the claims.

The invention claimed is:

1. A method for increasing the privacy of an e-mail message (M), comprising the steps of:

providing a central Server (PS) which stores tables of decryption key (K) data and the different identifications given to them by different users;

at the Sender's terminal, encrypting a said message (M) using an encryption key A, and sending by e-mail the encrypted message (EM) to the Recipient;

providing the Recipient with a Partial decryption Key (PK), which is the decryption key (K) data for said encrypted message (EM) modified by a given Operator (OP);

sending by the Sender's terminal to said central Server (PS) an Operator Identification ($OI_i$) belonging to the Sender, which identifies the Operator (OP) employed by the Sender to generate the Partial decryption key (PK), and which is obtained from the Operator Table stored at the Sender's end;

at the Server (PS), obtaining from the Sender additional data comprising one or more of the Sender's e-mail address, the Recipient's e-mail address, or an identifying code for the e-mail message;

at the Server (PS), obtaining the Operator (OP) from the Sender Operators Table (ST) stored at the Server, using the Operator Identification of the Sender ($OI_i$) sent to the Server by the Sender's terminal;

at the Server (PS), obtaining the Operator Identification of the Recipient ($OI_o$), from the Recipient Operators Table (RT) stored at the Server, using the Operator (OP);

sending to the Recipient its Operator Identification ($OI_o$), together with any additional data associated with the sender, or the recipient or the message;

at the Recipient, receiving the encrypted message (EM) and the Partial decryption Key (PK) from the Sender, and the Operator Identification ($OI_o$) from the Server;

deriving the Operator (OP) using the Operator Table stored at the Recipient's end, and the Operator Identification $OI_o$) received from the Server;

generating therewith the decryption Key from the Partial Key and said Operator (OP); and decrypting the encrypted e-mail message (EM) using said decryption key.

2. A method according to claim 1, wherein the Key is automatically generated by a software agent installed at the Sender's end.

3. A method according to claim 1 wherein the Key is generated by an action of the Sender.

4. A method according to claim 1, further comprising providing a Recipient who is not a registered user with a private e-mail central Server (PS) which stores concordance tables between decryption key data and the different identification given to them by different users, with a private e-mail message which had been encrypted (EM) utilizing an encryption key (K).

5. A method according to claim 4, where the Recipient is willing to register as a registered user with said Server, comprising:

a) Sending by the Sender to the Recipient the encrypted message (EM) with a Partial decryption Key (PK), which is the decryption key modified by a given Operator (OP);

b) Providing the Recipient with information indicating that a message (M) is waiting;

c) Offering the Recipient alternative options to receive the encrypted message (EM);

d) Upon the performing of the required act by the Recipient, generating by the Server (PS) a Table of Operators and Operator Identifiers for said Recipient, providing said Recipient with the software agent and the Table of Operators and Operator Identifiers, and sending said Recipient the Operator Identifier ($OI_o$) that belongs to the original message;

e) Installing by the Recipient the software agent on his terminal, thereby enabling the reception of receive messages from any Sender;

f) at the Recipient, receiving the encrypted message (EM) and the Partial Key (PK) from the Sender, and the Operator Identification ($OI_o$) from the Server;

g) extracting the Operator (OP) using the Operator Table stored at the Recipient's end, and generating therewith the decryption Key from the Partial Key (PK); and h) decrypting the encrypted e-mail message (EM).

6. A method according to claim 5, wherein the information indicating that a message is waiting comprises a self-activated program that generates a pup-up window on the terminal of the Recipient.

7. A method according to claim 6, wherein the self activated program is seat to the Recipient by the agent of the Sender.

8. A method according to claim 6, wherein the self-activated program is sent to the Recipient by the Server.

9. A method according to claim 8, wherein the Server sends the self-activating program to the Recipient when it is unable to locate the Recipient's address in its database.

10. A method according to claim 5, wherein the option comprises the option to subscribe to the Server.

11. A method according to claim 4, where the Recipient is not willing to register as a registered user with said Server, comprising:

Sending by the Sender to the Recipient the encrypted message (EM) with a Partial decryption Key (PK), which is the decryption key modified by a given Operator (OP);

b) sending by the Sender's terminal to said central Server (PS) an Operator Identification ($OI_i$) belonging to the Sender, which identifies the Operator (OP) employed by the Sender to generate the Partial decryption Key (PK), and which is obtained from the Operator Table stored at the Sender's end;

c) at the Server, obtaining the Operator (OP) from the Sender Operators Table (ST) stored at the Server, using the Operator Identification ($OI_i$) of the Sender sent to the Server (PS) by the Sender's terminal;

d) at the Server (PS), obtaining the Operator Identification ($OI_o$) of the Recipient, from the Recipient Operators Table (RT) stored at the Server, using the Operator (Oil);

e) Providing the Recipient with information indicating that a message (M) is waiting;

f) Offering the Recipient alternative options to receive the encrypted message (EM);

g) Upon the performing of the required act by the Recipient, sending the Recipient by the Server (PS) a temporary agent, together with the Operator (OP) needed to obtain the full decryption key of the message (M);

h) Running the temporary agent to decrypt the message without permanently installing a software agent on the Recipient's terminal.

12. A method for increasing the privacy of an e-mail message according any one of claims 1 to 3, further comprising performing, managing or controlling certified operations, with a high degree of confidence that a message has been generated by a given entity, and received by another given entity, comprising transmitting a private e-mail message, and further using identifying data associated with an e-mail message to trace a given message and/or its routing history.

13. A method according to claim 12, for awarding prizes in a lottery or lottery-like scheme.

14. A method according to claim 13, wherein a shop that supplies goods or services by order over the Internet keeps track of an order placed via e- mail, and remunerates the sender according to a preset rule.

15. A method according to claim 14, wherein a specific e-mail message is traced using its PK or other added data, such as a certificate or serial number, that is transmitted together with the message.

16. A method according to claim 15, wherein the message number or identifier is used to participate in a lottery in which messages are drawn and prizes allotted to their senders or recipients, according to a predetermined rule.

17. A method according to claim 1, comprising: identifying at a Server a Sender who transmits a large number of e-mail messages at the same time; and If the Sender of said messages has not previously identified itself to the Server as a legitimate Sender, and if the number and/or the frequency of messages it distributes exceeds a predetermined limit, preventing the messages to be received by the Recipient by omitting to provide to the intended Recipients Operator Identification for said messages.

18. A method of increasing the privacy of an e-mail message, wherein a Recipient in a private e-mail system, as claimed in any of the claims 1–11 or 13–17, advises the Server that it does not desire to receive messages from a given Sender, whereby the Server refuses to provide an Operator Identification for messages directed to that Recipient and originating from said Sender, thus effectively filtering out messages of undesired origin.

19. A method according to claim 18, wherein the user advises the Server that it does not desire to receive messages from a given Sender by sending a junk mail message that he has received from that Sender to the Server.

20. A method of increasing the privacy of an e-mail message, wherein a Recipient in a private e-mail system, as claimed in claim 12, advises the Server that the Receiver does not desire to receive messages from a given Sender, whereby the Server refuses to provide an Operator Identification for messages directed to that Recipient and originating from said Sender, thus effectively filtering out messages of undesired origin.

21. A system for increasing the privacy of an e-mail message (M), comprising: a central Server (PS) which stores tables of decryption key (K) data and the different identification given to them by different users;
   software agent provided at the Sender terminal, suitable to encrypt a said message (M) using an encryption key (K), and to cause the encrypted message (EM) to be sent to the Recipient by e-mail, together with a Partial decryption Key (PK), which is said decryption key (K) modified by a given Operator (OP);
   a program at the Sender's end, for sending to said central Server (PS) an Operator Identification ($OI_i$) belonging to the Sender, which identifies the Operator (OP) employed by the Sender to generate said Partial decryption Key (PK), and which is obtained from the Operator Table stored at the Sender's end;
   means located at the Server, for receiving information from the Sender and for obtaining the Operator (OP) from the Sender Operators Table (ST) stored at the Server (SP), using said Operator Identification ($OI_i$) of the Sender sent to the Server by said Sender's terminal, where said information comprises one or more of the Sender's e-mail address, the Recipient's e-mail address, or an identifying code for the e-mail message;
   means located at the Server (SP) for obtaining the Operator Identification ($OI_o$) of the Recipient, from the Recipient Operators Table (RT) stored at the Server, using the Operator (OP), and for sending to the Recipient its Operator Identification ($OI_o$), together with any additional data;
   a software agent at the Recipient's end, for receiving said encrypted message (EM) and the Partial Key (PK) from the Sender, and the Operator Identification ($OI_o$) from the Server;
   means provided at the recipient for extracting the Operator (OP) using the Operator Table stored at the Recipient end, and for generating therewith the decryption Key from said Partial Key (PK); and
   software at the Recipient's end for decrypting the encrypted e-mail message (EM).

* * * * *